United States Patent
Okunaka et al.

(10) Patent No.: US 8,336,928 B2
(45) Date of Patent: Dec. 25, 2012

(54) CAB-LOCK APPARATUS FOR VEHICLE

(75) Inventors: Shigeo Okunaka, Fujisawa (JP);
Hiromichi Matoba, Fujisawa (JP);
Kenji Nakanose, Koza-gun (JP); Toshio Suhara, Koza-gun (JP)

(73) Assignee: Isuzu Motors Limited, Tokyo (JP)

( * ) Notice: Subject to any disclaimer, the term of this patent is extended or adjusted under 35 U.S.C. 154(b) by 574 days.

(21) Appl. No.: 12/596,124

(22) PCT Filed: Apr. 11, 2008

(86) PCT No.: PCT/JP2008/057202
§ 371 (c)(1),
(2), (4) Date: Oct. 15, 2009

(87) PCT Pub. No.: WO2008/133059
PCT Pub. Date: Nov. 6, 2008

(65) Prior Publication Data
US 2010/0127510 A1     May 27, 2010

(30) Foreign Application Priority Data
Apr. 16, 2007   (JP) .................................. 2007-107629

(51) Int. Cl.
*E05C 3/02*   (2006.01)
*E05C 3/06*   (2006.01)

(52) U.S. Cl. .......... 292/194; 292/11; 292/200; 292/210; 292/DIG. 62; 180/89.14

(58) Field of Classification Search .................... 292/11, 292/194–196, 198, 200, 202, 210, DIG. 62; 180/89.14
See application file for complete search history.

(56) References Cited

U.S. PATENT DOCUMENTS

| | | | | |
|---|---|---|---|---|
| 2,344,532 A | * | 3/1944 | Brantingson | .................. 292/198 |
| 3,819,225 A | * | 6/1974 | Carlisle et al. | ............. 180/89.14 |
| 4,206,826 A | * | 6/1980 | McMillen et al. | ............ 180/328 |
| 4,413,694 A | * | 11/1983 | Slocombe et al. | ......... 180/89.14 |
| 4,413,695 A | * | 11/1983 | Slocombe et al. | ......... 180/89.14 |
| 4,413,696 A | * | 11/1983 | Slocombe et al. | ......... 180/89.14 |
| 5,025,880 A | * | 6/1991 | Kato | ......................... 180/89.14 |
| 5,029,910 A | * | 7/1991 | Genbauffe et al. | .......... 292/110 |
| 6,474,705 B1 | * | 11/2002 | Mori et al. | ..................... 292/216 |
| 6,688,658 B2 | * | 2/2004 | Mori et al. | ....................... 292/56 |
| 2010/0060018 A1 | * | 3/2010 | Okunaka et al. | ................ 292/11 |

FOREIGN PATENT DOCUMENTS

| | | |
|---|---|---|
| JP | 4-56586 U | 5/1992 |
| JP | 5-34088 U | 5/1993 |
| JP | 5-35564 U | 5/1993 |
| JP | 08-216933 A | 8/1996 |

* cited by examiner

*Primary Examiner* — Carlos Lugo (57) ABSTRACT

An operation rod includes a first rod and a second rod. A one-end portion of the first rod is connected to a lock closer to be rotationally movable. The second rod is supported so as to be slidingly movable relative to a hand lever. A connecting portion connects an opposite-end portion of the first rod and a one-end portion of the second rod to each other. The connecting portion includes: a long hole which is formed in the opposite-end portion of the first rod; and a pin which is formed on the one-end portion of the second rod and which engages with the long hole to be slidingly movable therein. While the hand lever is moving rotationally, the connecting portion allows the opposite-end portion of the first rod to move rotationally and slidingly relative to the one-end portion of the second rod.

1 Claim, 5 Drawing Sheets

CAB-LOCK APPARATUS FOR VEHICLE

TECHNICAL FIELD

The invention relates to a cab-lock apparatus for locking a tiltable cab in position on the chassis side.

BACKGROUND ART

A cab-lock apparatus that has been already available includes a cab-lock hook, a main rod, a lock closer, and an operation rod, and is capable of locking a cab which is tiltable about a tilt shaft provided on a forward-end side but which is not tilted when locked.

A hand lever is supported so as to be rotationally movable relative to the cab. The cab-lock hook, which is provided in a rear-end portion of the cab, is interlocked with the hand lever by means of the main rod. The cab-lock hook is moved between a locking position where the cab-lock hook engages with a pin provided on the chassis side, and a releasing position where the engagement of the cab-lock hook with the pin is released. The lock closer is provided in the other end portion of the cab. The operation rod is supported so as to be slidable relative to the vehicle body. The lock closer is moved, along with the siding motion of the operation rod, between a closing position and an unclosing position. While the cab-lock hook is in the locking position, the lock closer is either in the closing position where the lock closer blocks the movement of the cab-lock hook, or in the unclosing position where the lock closer allows the cab-lock hook to move. To put it differently, the cab, while not tilted, is locked by means of the cab-lock hook, and the cab is held locked by means of the lock closer.

Patent Document 1: JP-U-5-34088
Patent Document 2: JP-U-5-35564

DISCLOSURE OF THE INVENTION

Problems to be Solved by the Invention

Suppose a case where the cab has been locked in the non-tilted state by means of the cab-lock hook of the cab-lock apparatus, and where the lock closer of the cab-lock apparatus has been holding the non-tilted cab thus locked. In this case, to tilt the cab thus held, the operator uses the operation rod to move the lock closer from the closing position to the unclosing position, and turns the hand lever to move the cab-lock hook from the locking position to the releasing position. So, the operator needs to operate both the operation rod and the hand lever. Accordingly, if the operation rod is slidably supported on the hand lever, the operability of the operation rod will possibly be improved.

In the conventional cab-lock apparatus described above, however, simply supporting the operation rod slidably on the hand lever cannot allow the hand lever to function properly because the rotational movement of the hand lever is restricted by the operation rod.

The above-mentioned inconvenience is avoidable by use of a cable instead of the operation rod, but the use of the cable results in such other inconveniences as a cost increase and the necessity of securing a waterproofness of the cable.

The invention, therefore, aims to provide a cab-lock apparatus capable of improving the operability of the operation rod without using a cable.

Means for Solving the Problems

To achieve the above-mentioned object, the invention provides a cab-lock apparatus for a cab-over-engine type vehicle equipped with a cab that is tiltable about a one-end portion side of the cab. The cab-lock apparatus locks an opposite-end portion side of the cab in a position on a chassis side while the cab is in a non-tilted position. The cab-lock apparatus comprises a cab-lock hook, a hand lever, a connecting mechanism, a lock closer, and an operation rod.

The cab-lock hook is provided in the opposite-end portion of the cab and is movable between a locking position where the cab-lock hook engages with a pin fixed to the chassis side, and a releasing position where the cab-lock hook and the pin are disengaged. The hand lever is supported so as to be rotationally movable relative to the cab. The connecting mechanism connects the hand lever and the cab-lock hook to each other, and moves the cab-lock hook between the locking position and the releasing position along with a rotational movement of the hand lever. The lock closer is provided in the opposite-end portion of the cab, and is movable between a closing position and an unclosing position. The operation rod is connected to the lock closer.

While the cab-lock hook is at the locking position, the lock closer blocks a movement of the cab-lock hook when at the closing position, and allows the movement of the cab-lock hook when at the unclosing position.

The operation rod includes a first rod and a second rod. A one-end portion of the first rod is connected to the lock closer so as to be rotationally movable. The second rod is supported so as to be slidingly movable relative to the hand lever. An opposite-end portion of the first rod and a one-end portion of the second rod are connected to each other by means of a connecting portion. The connecting portion includes a long hole and a pin which engages with the long hole so as to be slidingly movable therein. The long hole is formed in one of the opposite-end portion of the first rod and the one-end portion of the second rod, and the pin is formed on the other one of the opposite-end portion of the first rod and the one-end portion of the second rod.

While the hand lever is moving rotationally, the connecting portion allows the opposite-end portion of the first rod to move rotationally and slidingly relative to the one-end portion of the second rod. While the cab-lock hook is at the locking position and the lock closer is at the closing position, the connecting portion is in a state capable of transmitting operation force; while the cab-lock hook is at the releasing position, the connecting portion is incapable of transmitting operation force. While the connecting portion is in a state capable of transmitting operation force, a sliding movement of the second rod in a predetermined direction brings the pin into contact with an end portion of the long hole and thus moves the first rod in a close-releasing direction. Along with the movement of the first rod in the close-releasing direction, the lock closer that has been at the closing position moves to the unclosing position. While the connecting portion is in the state incapable of transmitting operation force, a sliding movement of the second rod moves the first rod rotationally about the one-end portion, but does not move the lock closer.

Suppose a case where a cab is locked in the non-tilted position by means of a cab-lock hook and the cab-lock hook is kept in the locked state by means of a lock closer. With the above-described configuration, in order to tilt the cab, the operator firstly moves the second rod slidingly in a predetermined direction. The sliding movement of the second rod in the predetermined direction brings the pin into contact with the end portion of the long hole, and thus moves the first rod in the close-releasing direction. Along with the movement of the first rod, the lock closer moves to the unclosing position. Once the lock closer has reached the unclosing position, the operator turns the hand lever so as to move the cab-lock hook from the locking position to the releasing position. In order to turn the handle lever, the operator has to move the lock closer that has been at the closing position to the unclosing position. To this end, all the operator has to do is operating the second rod that is supported so as to be slidingly movable relative to the hand lever. Thus accomplished is an improvement in the operability of the operation rod.

In addition, the operation rod is composed of the two separate bodies—the first rod and the second rod. The opposite-end portion of the first rod and the one-end portion of the second rod are connected to each other by means of the connecting portion, which includes the long hole and the pin. While the hand lever is moving rotationally, the connecting portion allows the opposite-end portion of the first rod to move rotationally and slidably relative to the one-end portion of the second rod. Accordingly, the rotational movement of the hand lever is never restricted by the operation rod.

Accordingly, the operability of the operation rod can be improved without using a cable.

In addition, while the cab-lock hook is at the releasing position, the connecting portion is in the state incapable of transmitting operation force. While the connecting portion is in the state incapable of transmitting operation force, even if the operation force inputted into the second rod moves the second rod slidingly, the operation force cannot be transmitted to the lock closer. Accordingly, in the event that, while the cab-lock hook is at the releasing position, the operation force is erroneously inputted into the second rod, the operation force is never transmitted to the lock closer.

Moreover, the one-end portion of the second rod may be placed in the vicinity of the pivot shaft about which the hand lever moves rotationally relative to the cab.

With the above-described configuration, while the hand lever is moving rotationally, the middle section of the second rod can be placed so as to always overlap the hand lever. Accordingly, only quite a small space has to be secured for the second rod to move along with the rotational movement of the hand lever. This can contribute to space saving.

Effects of the Invention

According to the invention, the operability of the operation rod can be improved without using a cable.

DESCRIPTION OF SYMBOLS 1 cab
2 chassis side
3 cab-lock apparatus
4 pin
5 support plate
8 hand lever
9 main rod (connecting mechanism)
10 base
11 link (connecting mechanism)
12 cab-lock hook
13 front-side plate portion
14 rear-side plate portion
15 bracket
17 first pivot shaft
19 engaging-shaft accommodating recessed portion
20 link plate
24 second pivot shaft
27 main-rod connecting shaft
29 hook portion
30 internal sidewall of hook portion
41 pivot shaft
60 lock closer
62 spring member
63 lock-closer connecting shaft
64 cam portion
65 engaging recessed portion
70 operation rod
71 first rod
71a one-end portion of the first-rod
71b opposite-end portion of the first-rod
72 second rod
72a one-end portion of the second-rod
72b opposite-end portion of the second-rod
73 connecting portion
80 long hole
81 pin

BEST MODES FOR CARRYING OUT THE INVENTION

An embodiment of the invention will be described below by referring to the drawings.

Figure 1:
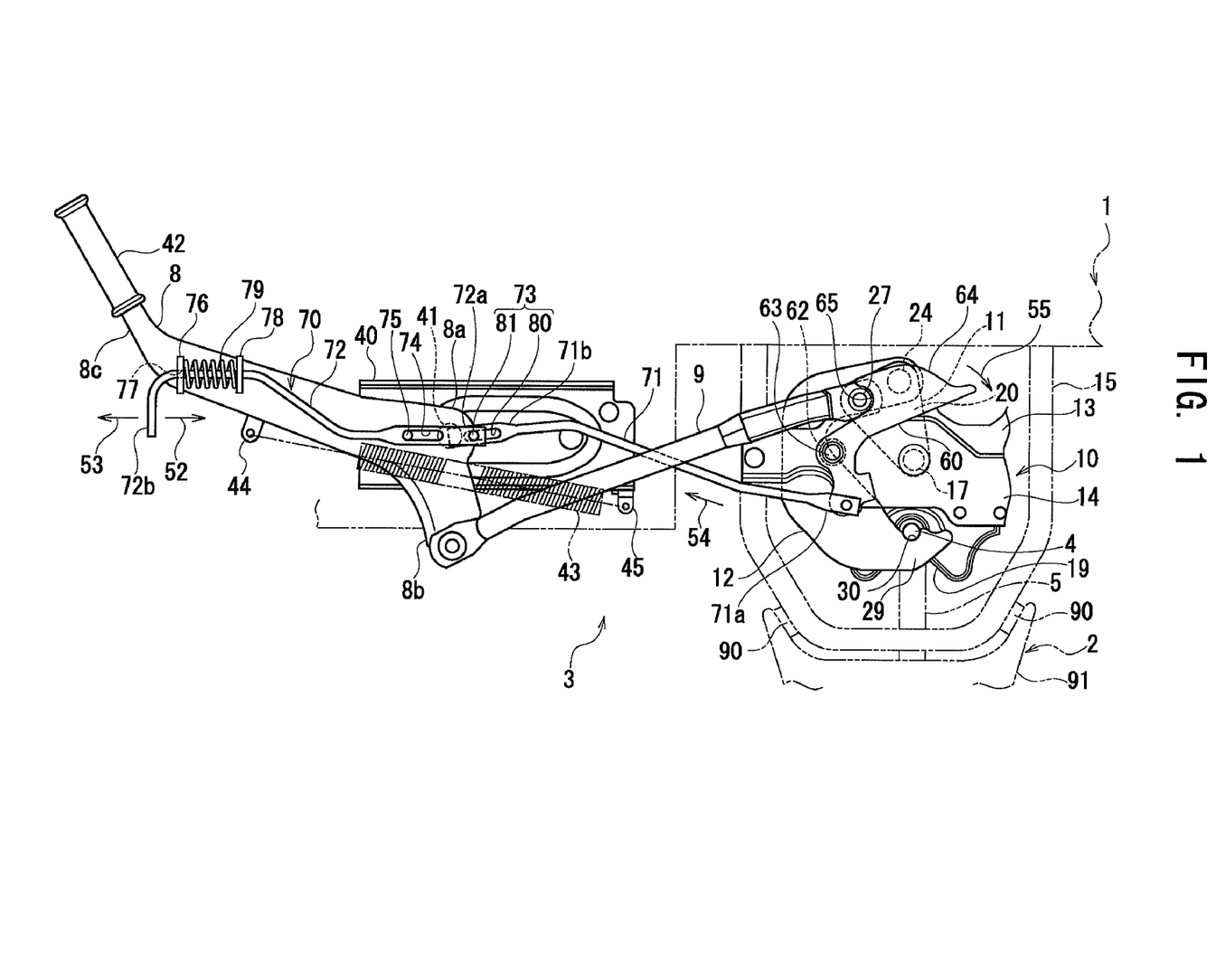
FIG. 1 is a rear-side view in which a cab-lock apparatus of an embodiment in a lock-closed state is illustrated as seen from the rear side of the vehicle.
Figure 2:
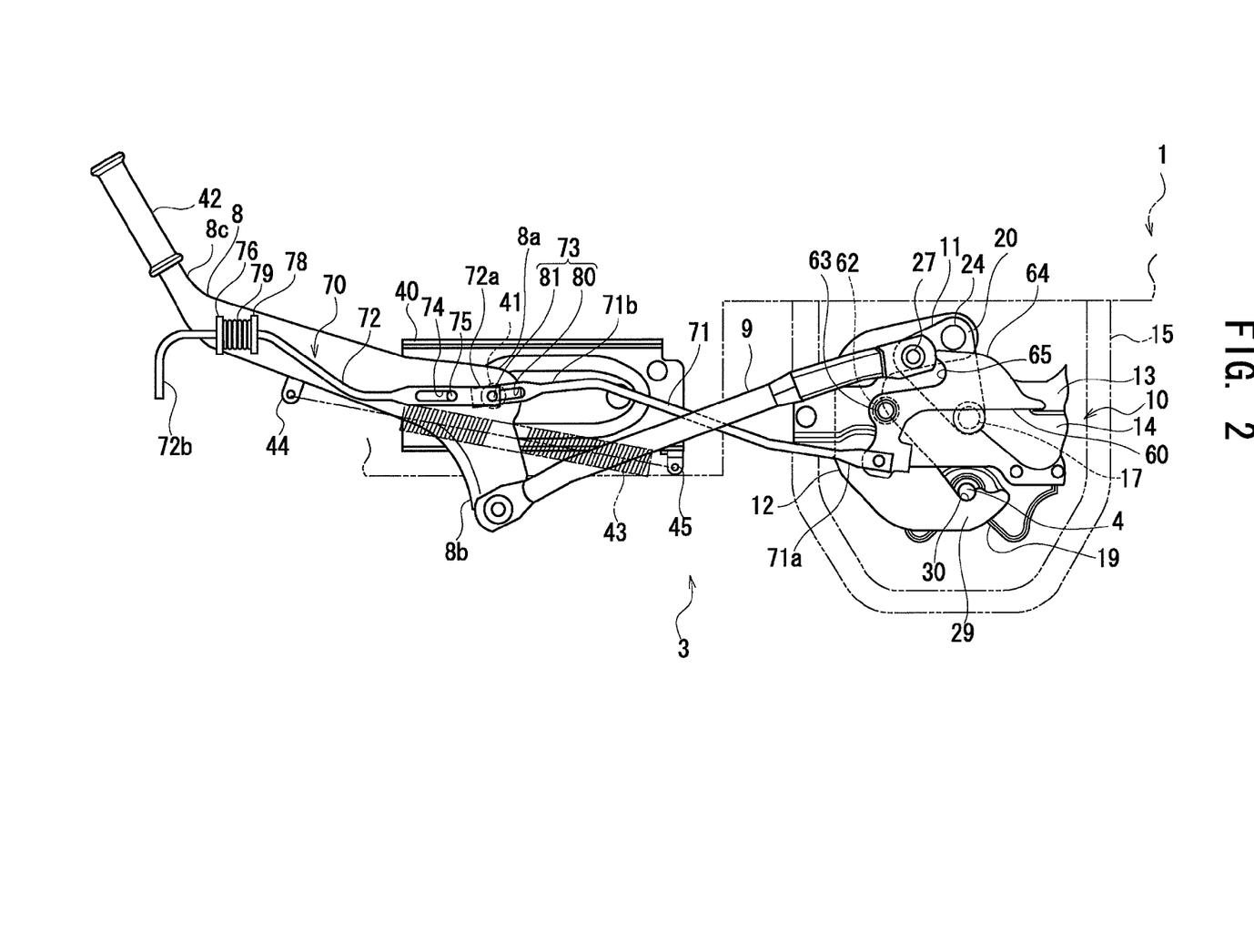
FIG. 2 is a rear-side view illustrating an operation of cancelling the lock-closed state of the cab-lock apparatus of FIG. 1.
Figure 3:
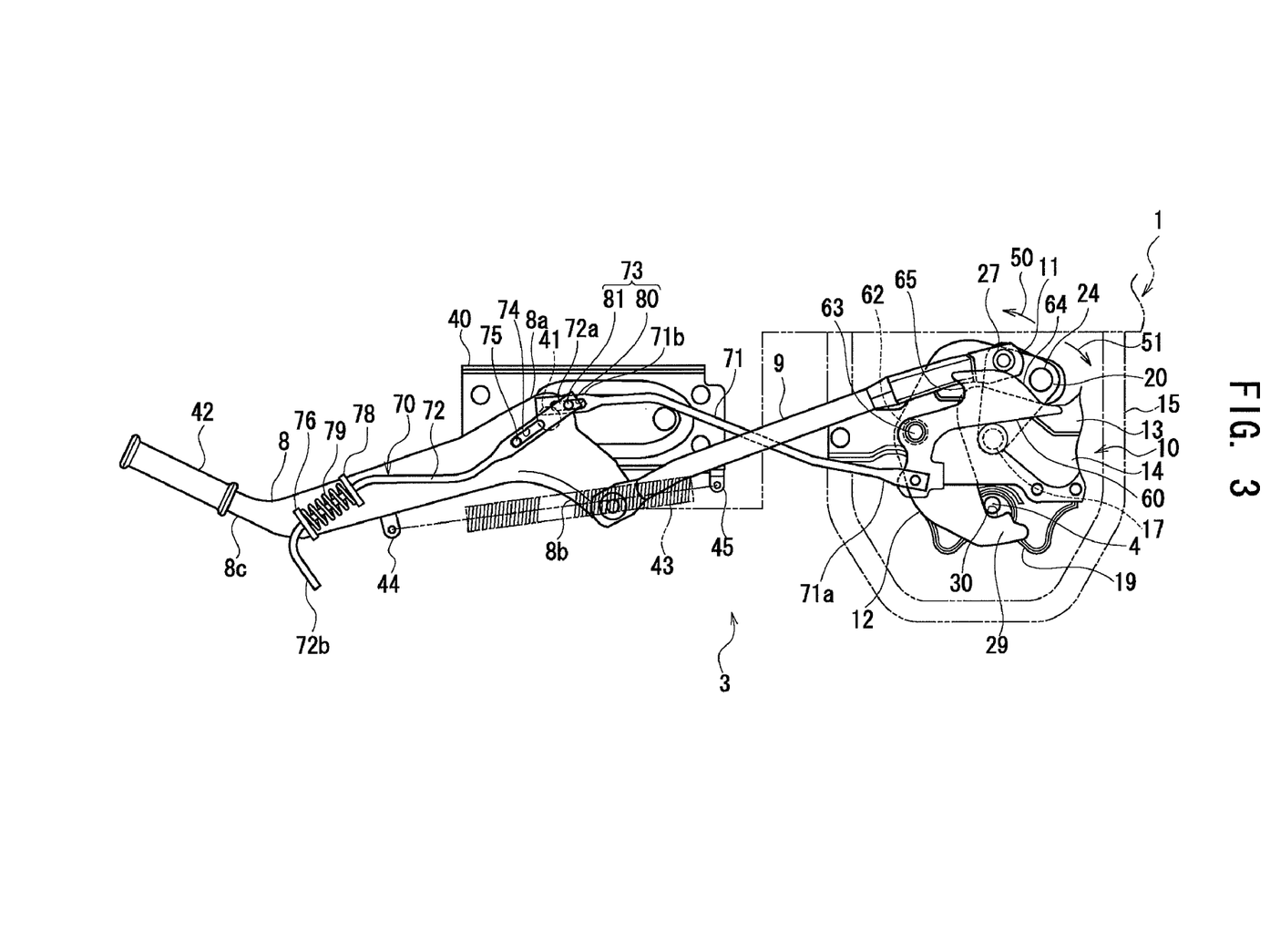
FIG. 3 is a rear-side view illustrating an operation of unlocking the cab-lock apparatus of FIG. 1.
Figure 4:
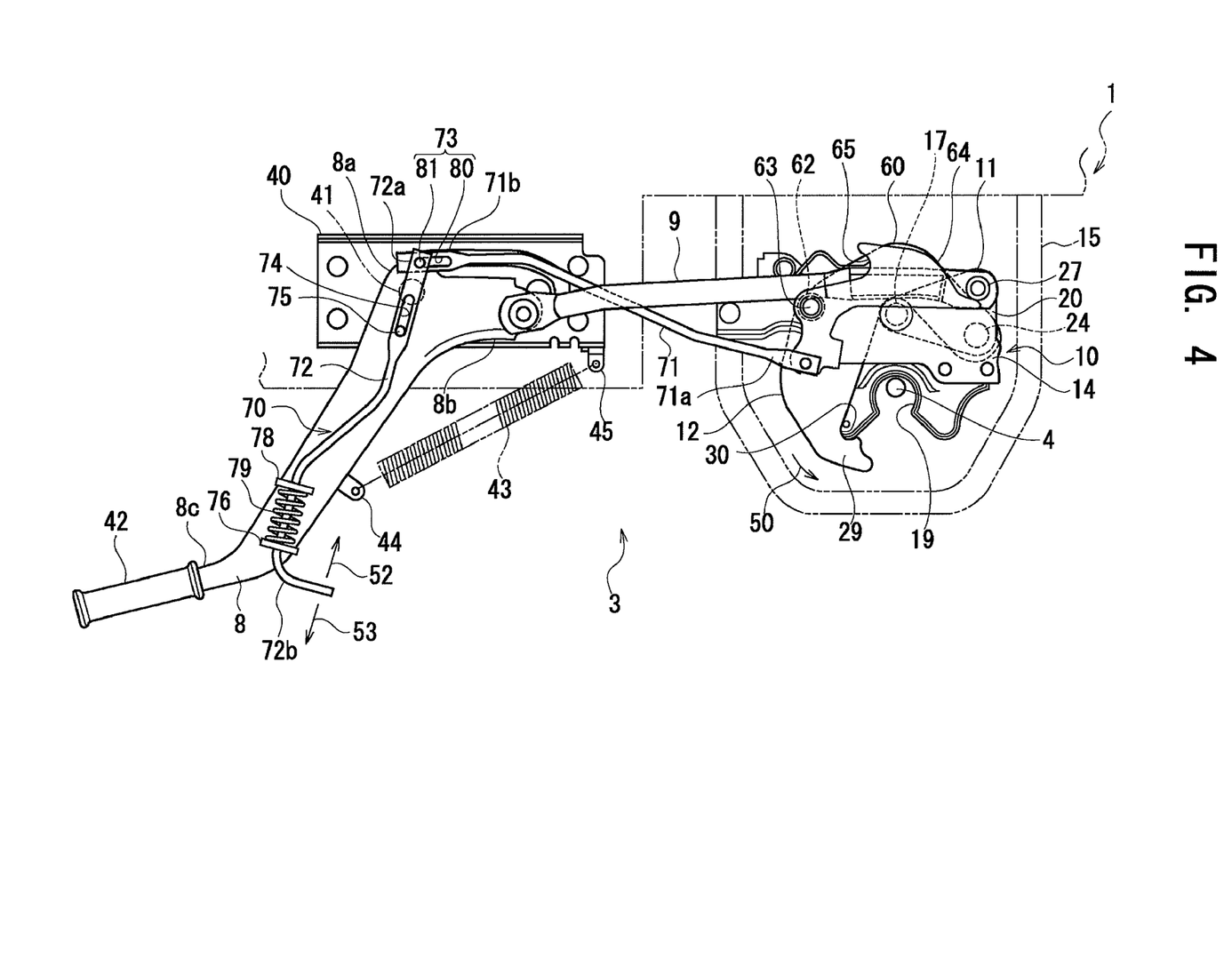
FIG. 4 is a rear-side view illustrating the cab-lock apparatus of FIG. 1 in an unlocked state.
Figure 5:
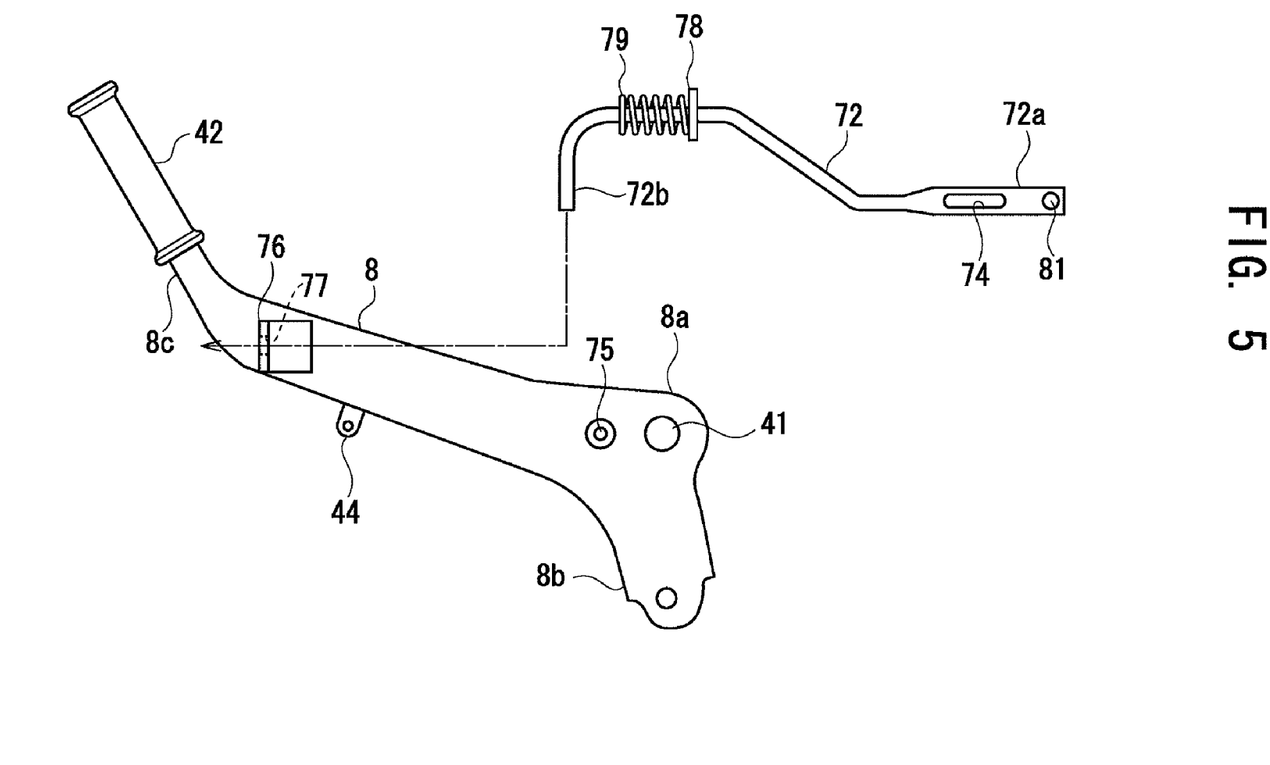
FIG. 5 is an exploded view illustrating a principal portion of the cab-lock apparatus of FIG. 1.

FIG. 1 is a rear-side view in which a cab-lock apparatus of this embodiment in a lock-closed state is illustrated as seen from the rear side of the vehicle. FIG. 2 is a rear-side view illustrating an operation of cancelling the lock-closed state of the cab-lock apparatus of FIG. 1. FIG. 3 is a rear-side view illustrating an operation of unlocking the cab-lock apparatus of FIG. 1. FIG. 4 is a rear-side view illustrating the cab-lock apparatus of FIG. 1 in an unlocked state. FIG. 5 is an exploded view illustrating a principal portion of the cab-lock apparatus of FIG. 1. Note that the right-hand side and the left-hand side mentioned in the following descriptions indicate the right-hand side and the left-hand side in the vehicle width direction seen from a viewpoint directed forward of the vehicle.

In a cab-over-engine type truck illustrated in FIG. 1, a cab 1 is supported with the front-end side of the cab 1 being tiltable about a tilt shaft (not illustrated) relative to a chassis side 2. A cab-lock apparatus 3 is provided on the back-side wall of the cab 1 and locks the rear-end side of the cab 1 in a not-tilted, upright state in position on the chassis side 2. A pin 4 is fixed to the chassis side 2 so as to correspond to the cab-lock apparatus 3.

The pin 4 is a bar-shaped member extending so as to connect upper-end portions of support plates 5, which are arranged in the front-to-rear direction of the vehicle so as to face each other with a space in between. The lower-end portion of each support plate 5 is fixed to the chassis side 2.

As FIGS. 1 to 5 illustrate, the cab-lock apparatus 3 of this embodiment includes a hand lever 8, a main rod 9, a base 10, a link 11, a cab-lock hook 12, a lock closer 60, and an operation rod 70. The main rod 9 and the link 11 together form a connecting mechanism to connect the hand lever 8 and the cab-lock hook 12 to each other. The connecting mechanism works along with the rotational movement of the hand lever 8 so that the cab-lock hook 12 can move between a locking position and a releasing position, which will be described in detail later. The operation rod 70 includes a first rod 71 and a second rod 72.

A hand-lever bracket 40 is fixed to a back-side wall of the cab 1 at a position located on one side (the left-hand side in this embodiment) in the vehicle-width direction. Of the hand lever 8, a one-end portion (the right end portion in FIG. 1) 8a located on the inner side in the vehicle-width direction is rotatably supported by the hand-lever bracket 40 with a pivot shaft 41. The hand lever 8 is rotationally movable about the pivot shaft 41 between a locking position shown in FIG. 1 and an unlocked position shown in FIG. 4. The hand lever 8 includes a connecting end portion 8b that extends from the one-end portion 8a downwards in FIG. 1. The connecting end portion 8b is linked to the link 11 via the main rod 9 extending in the vehicle width direction. A grip 42 is fixed to an opposite-end portion (the left end portion in FIG. 1) 8c of the hand lever 8. In a state where the lock closer 60, which will be described later, is in an unclosing position and, in addition, where the hand lever 8 is in the locking position (see FIG. 2), a downward pushing action of the grip 42 by the operator makes the hand lever 8 move rotationally about the pivot shaft 41 to the unlocking position (see FIG. 4). The rotational movement of the hand lever 8 from the locking position to the unlocking position makes the main rod 9 move in an unlocking direction (rightwards in FIG. 1) whereas the rotational movement of the hand lever 8 from the unlocking position to the locking position makes the main rod 9 move in a locking direction (leftwards in FIG. 1).

A spring member 43 is provided between the hand lever 8 and the hand-lever bracket 40. A one-end side of the spring member 43 is locked in a spring support portion 44 located between the one-end portion 8a and the opposite-end portion 8c whereas an opposite-end side of the spring member 43 is locked in a spring support portion 45 located on the bottom-end side of the hand-lever bracket 40. Suppose a case where the handle lever 8 is moving rotationally from the locking position to the unlocking position. In this case, the spring member 43 biases the hand lever 8 towards the locking position while the handle lever 8 is moving rotationally from the locking position to a predetermined, dividing position, whereas the spring member 43 biases the hand lever 8 towards the unlocking position while the handle lever 8 is moving rotationally from the predetermined, dividing position to the unlocking position.

The link 11 is supported so as to be rotationally movable relative to the base 10 about a first pivot shaft 17 both in the locking direction and in the unlocking direction. The cab-lock hook 12 is supported so as to be rotationally movable relative to the link 11 about a second pivot shaft 24. Accordingly, the cab-lock hook 12 is movable relative to the base 10 both in the locking direction and in the unlocking direction. A rotational movement of the link 11 in the locking direction makes the cab-lock hook 12 move also in the locking direction whereas a rotational movement of the link 11 in the unlocking direction makes the cab-lock hook 12 also in the unlocking direction.

The base 10 includes a front-and-rear pair of plate portions (specifically, a front-side plate portion 13 and a rear-side plate portion 14) that are arranged facing each other with a space in between. A bracket 15 to which the base 10 is fixed is provided on the back-side wall of the cab 1. The bracket 15 has a substantially frame shape. The base 10 (the front-side plate portion 13 and the rear-side plate portion 14) is fastened and thus fixed to the bracket 15 with the principal portion of the base 10 being installed inside the bracket 15. A pin-insertion hole (not illustrated) is formed in a lower portion of the bracket 15. While the cab 1 is in the non-tilted state, the pin 4 and the upper portions of the front and the rear support plates 5 are positioned through the pin-insertion hole. While the cab 1 is in the non-tilted state, the lower portion of the bracket 15 is supported on a cab mounting bracket 91 of the chassis side 2 with anti-vibration elastic members 90 placed in between.

A first-pivot-shaft supporting hole (not illustrated) is formed in each of the front-side plate portion 13 and in the rear-side plate portion 14. The first pivot shaft 17, which extends in the front-to-rear direction of the vehicle, is positioned through and thus supported by the first-pivot-shaft supporting holes. An engaging-shaft accommodating recessed portion 19 is formed in a lower portion of the front-side plate portion 13. While the cab 1 is in the non-tilted position, the pin 4 is rested on the engaging-shaft accommodating recessed portion. A lock-closer connecting shaft 63 is formed protruding rearwards from the rear-side plate portion 14. The lock closer 60 is supported by the lock-closer connecting shaft 63 so as to be rotationally movable about the lock-closer connecting shaft 63.

The link 11 includes: a front-and-rear pair of link plates 20 (though the front-side link plate is not illustrated) that are arranged facing each other with a space in between; and a connecting portion (not illustrated) that connects the front-side and rear-side link plates 20 to each other. The link 11 is placed between the front-side and rear-side plate portions 13 and 14 of the base 10. A first-pivot-shaft insertion hole (not illustrated) is formed in a one-end side (in the lower-end side in FIG. 1) of each of the front-side and rear-side link plates 20. The first pivot shaft 17 is positioned through the first-pivot-shaft insertion holes. Accordingly, the link 11 is supported so as to be rotationally movable relative to the back-side wall of the cab 1 about the first pivot shaft 17.

A second-pivot-shaft supporting hole (not illustrated) is formed in an opposite-end side (in the upper-end side in FIG. 1) of each of the front-side and rear-side link plates 20. The second pivot shaft 24, which extends in the front-to-rear direction of the vehicle, is positioned through and is thus supported by the second-pivot-shaft supporting holes. A main-rod connecting shaft 27 is formed protruding rearwards from the opposite-end side of the rear link plate 20. The main rod 9 is connected to the main-rod connecting shaft 27.

The position where the main rod 9 is connected to the main-rod connecting shaft 27 is located at the rear of the rear link plate 20. Suppose a case where a rotational movement of the hand lever 8 from the locking position with the opposite-end portion 8c of the hand lever 8 moving downwards makes the main rod 9 move in the unlocking direction (rightwards in FIG. 1). In this case, the link 11 moves rotationally, along with the movement of the hand lever 8, about the first pivot shaft 17 in the unlocking direction (in the direction indicated by an arrow 51 in FIG. 3) from the locking position (the position shown in FIGS. 1 and 2) to the releasing position (the position shown in FIG. 4). Conversely, suppose a case where a rotational movement of the hand lever 8 with the opposite-end portion 8c of the hand lever 8 moving upwards makes the main rod 9 move in the locking direction (leftwards in FIG. 1). In this case, the link 11 moves rotationally, along with the movement of the hand lever 8, about the first pivot shaft 17 in the locking direction (in the direction indicated by an arrow 50 in FIG. 3) from the releasing position to the locking position.

The cab-lock hook 12 has a substantially L-shaped plate form, and is placed between the front-side and rear-side link plates 20 of the link 11. A second-pivot-shaft insertion hole (not illustrated) is formed in a one-end side (in the upper-end side in FIG. 1) of the cab-lock hook 12. The second pivot shaft 24 is positioned through the second-pivot-shaft insertion hole. Accordingly, the cab-lock hook 12 is supported so as to be rotationally movable relative to the link 11 about the second pivot shaft 24. The course of the movement of the cab-lock hook 12 relative to the cab 1 is defined by the rotation of the link 11 about the first pivot shaft 17 and by the rotation of the cab-lock hook 12 about the second pivot shaft 24. A hook portion 29 is formed on an opposite-end side (in the lower-end side in FIG. 1) of the cab-lock hook 12. The hook portion 29 includes an inner-side surface 30 having a concave shape with an open top.

A coil-shaped spring member (not illustrated) and a spacer (not illustrated) are fitted to the outer circumference of the second pivot shaft 24. One side of the spring member engages with the cab-lock hook 12 whereas the opposite side of the spring member engages with the connecting portion of the link 11. The spring member biases the cab-lock hook 12 relative to the link 11 in the locking direction (in the direction indicated by the arrow 50 in FIG. 3). In addition, though not illustrated, a stopper is formed in the link 11, and restricts the range of movement of the cab-lock hook 12 in the unlocking direction. Accordingly, while no external force is acting on the cab-lock hook 12 (including a case where the link 11 is in the releasing position), the spring member and the stopper together function to keep the cab-lock hook 12 at a predetermined, relative position to the link 11.

The lock closer 60 is substantially plate-shaped, and is placed rearward of the rear-side plate portion 14. A connecting-shaft insertion hole (not illustrated) is formed in a middle portion of the lock closer 60. The lock-closer connecting shaft 63 is positioned through the connecting-shaft insertion hole. The lock closer 60 is supported so as to be rotationally movable relative to the base 10 about the lock-closer connecting shaft 63. The first rod 71 of the operation rod 70 is connected to an opposite-end portion of the lock closer 60 (the lower-end portion in FIG. 1). While the link 11 is in the locking position, the lock closer 60 moves, along with the motion of the operation rod 70, between the closing position (see FIG. 1) and the unclosing position (see FIG. 2).

A cam portion 64 that has a curved-surface shape is formed in an outer-edge portion on a one-end side (upper-end side in FIG. 1) of the lock closer 60. An engaging recessed portion 65 engagable with the main-rod connecting shaft 27 is formed in a position located between the connecting-shaft insertion hole and the cam portion 64. A coil-shaped spring member (biasing member) 62 and a spacer (not illustrated) are fitted to the outer circumference of the lock-closer connecting shaft 63. A one-end side of the spring member 62 engages with the lock closer 60 whereas an opposite-end side of the spring member 62 engages with the lock-closer connecting shaft 63. The spring member 62 biases the lock closer 60 to the closing position. While the link 11 is in the locking position, the biasing force of the spring member 62 sets the lock closer 60 in the closing position, and, in this state, the engaging recessed portion 65 of the lock closer 60 engages with the main-rod connecting shaft 27. Such an engagement prevents the lock closer 60 from moving in the unlocking direction.

Suppose a case where the lock closer 60 is set in an unclosing position with the engaging recessed portion 65 and the main-rod connecting shaft 27 being disengaged. In this case, a rotational movement of the link 11 from the locking position to the unlocking position brings the cam portion 64 into contact with the outer-circumferential surface of the main-rod connecting shaft 27 as shown in FIGS. 3 and 4. Accordingly, the lock closer 60 is prevented from moving to the closing position.

The first rod 71 of the operation rod 70 is located on the inner side in the vehicle-width direction (on the right-hand side in FIG. 1) whereas the second rod 72 is located on the outer side in the vehicle-width direction (on the left-hand side in FIG. 1). A one-end portion (the right-hand-side end portion in FIG. 1) 71a of the first rod 71 is connected to the opposite-end side of the lock closer 60 (the lower-end side in FIG. 1) so as to be rotationally movable whereas an opposite-end portion (the left-hand-side end portion in FIG. 1) 71b is connected to a one-end portion (the right-hand-side end portion in FIG. 1) 72a of the second rod 72 with a connecting portion 73.

A long-hole-shaped slide slot 74 is formed in the one-end portion 72a side of the second rod 72. An opposite-end portion 72b of the second rod 72 is bent towards a predetermined direction (downwards in FIG. 1). A locking protrusion 75 is formed on the one-end portion 8a side of the hand lever 8. The locking protrusion 75 engages with the slide slot 74 so as to be slidable therein. A rod supporting plate 76 is formed protruding from a portion on the opposite-end portion 8c side of the hand lever 8. A rod insertion hole 77 is formed in the rod supporting plate 76, and the opposite-end portion 72b side of the second rod 72 is positioned through the rod insertion hole 77. The locking protrusion 75 is locked into the slide slot 74 formed on the one-end portion 72a side of the second rod 72 whereas the opposite-end portion 72b side of the second rod 72 is positioned through the rod-insertion hole 77. Accordingly the second rod 72 is supported so as to be slidingly movable relative to the hand lever 8. The direction in which the second rod 72 slides and the range within which the second rod 72 can move are restricted by the slide slot 74. In addition, the one-end portion 72a of the second rod 72 is positioned in the vicinity of the pivot shaft 41. While most of the second rod 72—specifically, including the entire middle section thereof but excluding the two end portions thereof—is overlapped on the hand lever 8, the second rod 72 moves rotationally together with the hand lever 8. Note that, alternatively, a locking protrusion may be formed on the second rod 72 and a slide slot may be formed in the hand lever 8.

A spring supporting plate 78 is fixed to the second rod 72. The spring supporting plate 78 is placed at the inner side, in the vehicle width direction, of the rod supporting plate 76 (i.e., at the right-hand side in FIG. 1). A spring member (biasing member) 79 is provided between the spring supporting plate 78 and the rod supporting plate 76. This spring member 79 biases the second rod 72 in the closing direction (in the direction indicated by an arrow 52 in FIG. 1).

The connecting portion 73 includes: a long hole 80 which is formed in the opposite-end portion 71b of the first rod 71; and a pin 81 which is formed on the one-end portion 72a of the second rod 72 and which engages with the long hole 80 so as to be slidingly movable. Note that, alternatively, a long hole may be formed in the one-end portion 72a of the second rod 72, and a pin that engages with the long hole 80 so as to be slidingly movable may be formed on the opposite-end portion 71b of the first rod 71.

While the hand lever 8 is moving rotationally about the pivot shaft 41, the connecting portion 73 allows the opposite-end portion 71b of the first rod 71 to move rotationally and slidingly relative to the one-end portion 72a of the second rod 72.

While the cab-lock hook 12 is at the locking position and the lock closer 60 is at the closing position (i.e., in the case of the state illustrated in FIG. 1), the connecting portion 73 is in a state capable of transmitting operation force. Suppose that the connecting portion 73 is in the state capable of transmitting operation force. When the opposite-end portion 72b of the second rod 72 is pulled and thus the second rod 72 moves slidingly in the close-releasing direction (in the direction indicated by an arrow 53 in FIG. 1), the pin 81 is brought into contact with one of the two end portions of the long hole 80—specifically, with the end portion located on the outer side in the vehicle width direction (with the left-hand-side end portion in FIG. 1). In addition, the first rod 71 is pulled and thus moves in the close-releasing direction (in the direction indicated by an arrow 54 in FIG. 1). Along with the movement of the first rod 71 in the close-releasing direction, the lock closer 60 that has been at the closing position moves rotationally in the close-releasing direction (in the direction indicated by an arrow 55 in FIG. 1).

Conversely, while the cab-lock hook 12 is in an unlocking state including a case where the cab-lock hook 12 is at the releasing position (i.e., a state illustrated in FIG. 4), the connecting portion 73 is in a state incapable of transmitting operation force. Suppose that the connecting portion 73 is in the state incapable of transmitting operation force. Even if the second rod 72 moves slidingly either in the closing direction (in the direction indicated by an arrow 52 in FIG. 4) or in the close-releasing direction (in the direction indicated by an arrow 53 in FIG. 4), only the first rod 71 moves rotationally about the one-end portion 71a without causing the lock closer 60 to move rotationally.

Accordingly, while the connecting portion 73 is in the state capable of transmitting operation force, an input of operation force into the second rod 72 makes the second rod 72 move slidingly in the close-releasing direction, and thus the operation force is transmitted, via the connecting portion 73 and the first rod 71, to the lock closer 60, so that the lock closer 60 moves from the closing position to the unclosing position. Conversely, while the connecting portion 73 is in the state incapable of transmitting operation force, even if an input of the operation force into the second rod 72 makes the second rod 72 move slidingly, the operation force is not transmitted to the lock closer 60.

As described above, in a state where the link 11 is at the locking position, an operation of pulling the operation rod 70 (i.e., the opposite-end portion 72b of the second rod 72) in the close-releasing direction against the biasing force of the spring member 79 makes the lock closer 60 move, against the biasing force of the spring member 62, from the closing position (see FIG. 1) to the unclosing position (see FIG. 2).

Suppose a case where the cab 1 has been locked in the non-tilted state by means of the cab-lock hook 12 and held in that locked state by means of the lock closer 60. In this case, to tilt the cab 1, the operator pulls the opposite-end portion 72b of the second rod 72 in the close-releasing direction 53, as illustrated in FIG. 1, against the biasing force of the spring member 79. The sliding movement of the second rod 72 pulled in the close-releasing direction 53 brings the pin 81 into contact with the end portion of the long hole 80, and then the first rod 71 moves by being pulled in the close-releasing direction 54. Along with the movement of the first rod 71, the lock closer 60 moves rotationally in the close-releasing direction 55 to the unclosing position illustrated in FIG. 2. After the lock closer 60 reaches the unclosing position, the operator pushes down the grip 42 to move the hand lever 8 rotationally from the locking position to the unlocking position. The rotational movement of the hand lever 8 turns the connecting portion 73 that has been in the state capable of transmitting operation force to be in the state incapable of transmitting operation force.

Once the hand lever 8 has started to move rotationally, the operator stops the action of pulling the second rod 72. Once the action of pulling the second rod 72 has been stopped, the spring member 79 biases the second rod 72 to move back in the closing direction. At this time, however, the connecting portion 73 that has already been in the state incapable of transmitting operation force does not allow the sliding movement of the second rod 72 to move the lock closer 60 rotationally. In addition, since the connecting portion 73 has already been in the state incapable of transmitting operation force, the spring member 62 biases the lock closer 60 in the closing position irrespective of whether the action of pulling the second rod 72 has or has not been stopped. Accordingly, as illustrated in FIG. 3, the cam portion 64 of the lock closer 60 is brought into contact with the outer-circumferential surface of the main-rod connecting shaft 27, and the contact prevents the lock closer 60 from moving to the closing position. Consequently, along with the rotational movement of the hand lever 8, the outer circumferential surface of the main-rod connecting shaft 27 slides on the cam portion 64 of the lock closer 60.

Once the hand lever 8 has moved rotationally to reach the unlocking position and the cab-lock hook 12 has moved to reach the releasing position as illustrated in FIG. 4, the operator stops the action of turning the hand lever 8. Even after the operator stops turning the hand lever 8, the biasing force of the spring member 43 can keep the hand lever 8 at the unlocking position.

Conversely, in a case of moving the cab-lock hook 12 that has been in the releasing position to the locking position, the operator turns the hand lever 8 that has been in the unlocking position to the locking position. Along with the movement of the hand lever 8, the cab-lock hook 12 starts moving in the locking direction.

The cab-lock hook 12 that has just started moving in the locking direction moves, firstly, rotationally about the first pivot shaft 17 from the releasing position (the position illustrated in FIG. 4) in the locking direction (in the direction indicated by an arrow 50 in FIG. 4). In the meanwhile, the relative position of the cab-lock hook 12 to the link 11 is kept unchanged at a predetermined position by the spring member and the stopper.

As the cab-lock hook 12 progresses in the locking direction, the inner-side edge of the cab-lock hook 12 is eventually brought into contact with the pin 4. Then, the cab-lock hook 12 that receives the biasing force of the spring member continues to be in contact with the pin 4, and moves rotationally in the locking direction about the second pivot shaft 24 along with the rotational movement of the link 11 in the locking direction. With this accompanied rotational movement about the second pivot shaft 24, the hook portion 29 approaches the pin 4 from below along with the movement of the cab-lock hook 12 in the locking direction.

As the cab-lock hook 12 progresses further in the locking direction, the internal sidewall 30 of the hook portion 29 engages with the pin 4 from below just before the cab-lock hook 12 reaches the locking position. Once the cab-lock hook 12 has reached the locking position, the hook portion 29 exerts a force, on the pin 4, of pulling the pin 4 upwards. Thereby, the cab-lock apparatus 3 turns to be in the cab-locking state. While the cab-lock apparatus 3 is in the cab-locking state, the cab 1 is locked in a position on the chassis side 2 securely and firmly.

In addition, once the link 11 and the cab-lock hook 12 have started moving from their respective releasing positions, the outer-circumferential surface of the main-rod connecting shaft 27 slides on the cam portion 64 of the lock closer 60 until the link 11 and the cab-lock hook 12 almost reach their respective locking positions. Without the contact of the main-rod connecting shaft 27 with the cam portion 64, the biasing force of the spring member 62 would move the lock closer 60 to the closing position, but the occurrence of the contact blocks such a movement of the lock closer 60.

Once the link 11 and the cab-lock hook 12 have reached their respective locking positions, the biasing force of the spring member 62 moves the main-rod connecting shaft 27 from the top of the cam portion 64 to the inside of the engaging recessed portion 65. The main-rod connecting shaft 27 then engages with the engaging recessed portion 65, and thus the lock closer 60 moves from the unclosing position to the closing position.

Before the operator turns the hand lever 8, the operator has to move the lock closer 60 from the closing position to the unclosing position. As has been described above, according to this embodiment, to this end, all the operator has to do is pulling the second rod 72 that is slidably supported by the hand lever 8. Thus accomplished is an improvement in the operability of the operation rod 70.

In addition, the operation rod 70 is composed of the two separate bodies—the first rod 71 and the second rod 72. The opposite-end portion 71b of the first rod 71 is connected to the one-end portion 72a of the second rod 72 by means of the connecting portion 73, which includes the long hole 80 and the pin 81. When the hand lever 8 moves rotationally, the connecting portion 73 allows the opposite-end portion 71b of the first rod 71 to move rotationally and slidingly relative to the one-end portion 72a of the second rod 72. For this reason, the rotational movement of the hand lever 8 is never restricted by the operation rod 70.

Accordingly, the operability of the operation rod 70 can be improved without using a cable.

In addition, while the cab-lock hook 12 is at the releasing position, the connecting portion 73 is in the state incapable of transmitting operation force. Even if the inputting of the operation force into the second rod 72 makes the second rod 72 move slidingly, the connecting portion 73 that is in the state incapable of transmitting operation force does not transmit the operation force to the lock closer 60. Accordingly, even in the event that an operation force is erroneously inputted into the second rod 72 while the cab-lock hook 12 is at the releasing position, the operation force is never transmitted to the lock closer 60.

Moreover, the one-end portion 72a of the second rod 72 is positioned in the vicinity of the pivot shaft 41, and the entire middle section of the second rod 72 always overlaps the hand lever 8 while the hand lever 8 is moving rotationally. Accordingly, only quite a small space has to be secured for the second rod 72 to move along with the rotational movement of the hand lever 8. This can contribute to space saving.

Note that the main-rod connecting shaft 27 serves as the locking engagement portion with the engaging recessed portion 65 in the above-described embodiment, but, alternatively, an engaging protrusion to serve as the locking engagement portion may be formed on the link 11.

INDUSTRIAL APPLICABILITY

The invention is applicable to a cab-lock apparatus used for locking a tiltable cab in a position on the chassis side.

The invention claimed is:

1. A cab-lock apparatus for a cab-over-engine vehicle equipped with a cab that is tiltable about a one-end portion side of the cab, the cab-lock apparatus locking an opposite-end portion side of the cab in a position on a chassis side while the cab is in a non-tilted position, the cab-lock apparatus comprising:
a cab-lock hook which is provided in the opposite-end portion of the cab and which is movable between a locking position where the cab-lock hook engages with a pin fixed to the chassis side, and a releasing position where the cab-lock hook and the pin are disengaged;
a hand lever which is supported so as to be rotationally movable relative to the cab;
a connecting mechanism which connects the hand lever and the cab-lock hook to each other and which moves the cab-lock hook between the locking position and the releasing position along with a rotational movement of the hand lever;
a lock closer which is provided in the opposite-end portion of the cab and which is movable between a closing position and an unclosing position; and
an operation rod which is connected to the lock closer,
wherein while the cab-lock hook is at the locking position, the lock closer blocks a movement of the cab-lock hook when at the closing position, and allows the movement of the cab-lock hook when at the unclosing position,
the operation rod includes a first rod and a second rod,
a one-end portion of the first rod is connected to the lock closer,
the second rod is supported so as to be slidingly movable relative to the hand lever,
an opposite-end portion of the first rod and a one-end portion of the second rod are connected to each other by means of a connecting portion including a long hole and a pin which engages with the long hole so as to be slidingly movable therein, the long hole being formed in one of the opposite-end portion of the first rod and the one-end portion of the second rod, the pin being formed on the other one of the opposite-end portion of the first rod and the one-end portion of the second rod,
while the cab-lock hook is at the locking position, movement in a closing direction of the operation rod moves the lock closer to the closing position,
while the hand lever is moving rotationally, the connecting portion allows the opposite-end portion of the first rod to move rotationally and slidingly relative to the one-end portion of the second rod; while the cab-lock hook is at the locking position and the lock closer is at the closing position, the connecting portion is in a state capable of transmitting operation force; and while the cab-lock hook is at the releasing position, the connecting portion is in a state incapable of transmitting operation force,
while the connecting portion is in the state capable of transmitting operation force, a sliding movement of the second rod in a predetermined direction brings the pin into contact with an end portion of the long hole and thus moves the first rod in a close-releasing direction; and, along with the movement of the first rod in the close-releasing direction, the lock closer that has been at the closing position moves to the unclosing position, and
while the connecting portion is in the state incapable of transmitting operation force, a sliding movement of the second rod moves the first rod rotationally about the one-end portion, but does not move the lock closer.

* * * * *